United States Patent
Schindler

(10) Patent No.: US 8,132,586 B2
(45) Date of Patent: Mar. 13, 2012

(54) MULTIPLE FLOW RATE DETECTION SYSTEM AND METHOD FOR CONSUMER APPLIANCE

(75) Inventor: Wayne Robert Schindler, Lisle, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 885 days.

(21) Appl. No.: 12/182,517

(22) Filed: Jul. 30, 2008

(65) Prior Publication Data

US 2010/0024541 A1 Feb. 4, 2010

(51) Int. Cl.
*E03B 1/00* (2006.01)

(52) U.S. Cl. .............................. 137/1; 137/487.5; 222/20

(58) Field of Classification Search ............. 137/1, 456, 137/459, 460, 487.5; 222/20–22, 59, 146.6
See application file for complete search history.

(56) References Cited

U.S. PATENT DOCUMENTS

| | | | | |
|---|---|---|---|---|
| 4,881,948 A * | 11/1989 | Nakane et al. | ................... | 48/192 |
| 5,287,884 A * | 2/1994 | Cohen | ............................ | 137/486 |
| 5,503,175 A * | 4/1996 | Ravilious et al. | .................. | 137/1 |
| 5,509,434 A * | 4/1996 | Boyd et al. | ........................ | 137/8 |
| 5,971,011 A * | 10/1999 | Price | .............................. | 137/460 |
| 6,375,834 B1 | 4/2002 | Guess et al. | | |
| 6,613,236 B1 | 9/2003 | Guess et al. | | |
| 6,721,669 B2 * | 4/2004 | Kopl et al. | ....................... | 702/55 |
| 7,201,005 B2 | 4/2007 | Voglewede et al. | | |
| 7,509,975 B2 * | 3/2009 | Hodge et al. | ................... | 137/456 |
| 2001/0003286 A1* | 6/2001 | Philippbar et al. | ........ | 137/624.12 |
| 2002/0189983 A1 | 12/2002 | Guess et al. | | |
| 2004/0007516 A1 | 1/2004 | Fritze et al. | | |
| 2004/0251210 A1 | 12/2004 | Fritze et al. | | |
| 2005/0268624 A1 | 12/2005 | Voglewede et al. | | |
| 2006/0196212 A1 | 9/2006 | Jenkins, Jr. et al. | | |
| 2007/0093936 A1 | 4/2007 | Johnson et al. | | |

* cited by examiner

*Primary Examiner* — Craig Schneider
*Assistant Examiner* — Matthew W Jellett
(74) *Attorney, Agent, or Firm* — Reinhart, Boerner, Van Deuren, P.C.

(57) ABSTRACT

A supervisory system and method for monitoring multiple flow rate fluid distribution systems and for determining the presence of a failure therein are provided. The system monitors the flow of fluid through the distribution system with a single flow meter, determines the flow rate at which fluid is flowing, and accumulates at that rate a water flow control value. If the accumulated water flow value exceeds a predetermined threshold, further flow of fluid in the system will be disabled. To take account of the multiple flow rates capable through the distribution system, the accumulated water flow value will decremented at the immediately preceding increment rate.

20 Claims, 1 Drawing Sheet

MULTIPLE FLOW RATE DETECTION SYSTEM AND METHOD FOR CONSUMER APPLIANCE

FIELD OF THE INVENTION

The present invention relates generally to fluid flow monitoring systems, and more particularly to a fluid flow rate fault detection system for consumer appliances having multiple flow rates associated therewith.

BACKGROUND OF THE INVENTION

Modern consumer appliances, for example a consumer refrigerator/freezer, include many conveniences that both increase the user experience as well as the energy efficiency of such appliances. As one example, a modern refrigerator/freezer includes both ice and water "through the door," often providing both cubed and crushed ice options. Such a feature greatly enhances the energy efficiency of the appliance since the consumer no longer needs to open the freezer door to obtain ice for a beverage, nor open the refrigerator door to retrieve chilled water for consumption. Instead, the consumer need only select the appropriate option on the front of the freezer door for which type of ice or water desired, put the glass into the receiving location, and wait for the selected item to be dispensed into the user's glass. If a user wants ice water, the user may select the ice, crushed or cubed, place the glass in the receiving location and allow the desired amount of ice to fill the glass. The user would then select the water option and fill the glass with the desired amount of water.

The user interface for such ice and water through the door features is typically one or a combination of electronic sensors, mechanically actuated switches, touch pads, slide switches, etc. For the mechanically operated user interfaces, typically a user would depress a mechanical switch or button to select a desired function, and then press the back of the glass against an additional mechanical switch or button to dispense the desired item, e.g. ice, and/or water. For appliances that include electronic controls, the user may simply touch a touch pad or touch screen to make the desired selection, and may then simply place the glass into the receiving location wherein its presence may be sensed by the electronic sensors to begin the dispensing operation of the selected item. Often, a combination of mechanical and electronic switches and/or sensors may be used depending on the particular model and features provided by the manufacturer. Typically, nearly all current models include an electronic controller that controls the operation of the refrigerator/freezer and the ice and water through the door operations based on sensed inputs, be they from electronic or mechanical interfaces.

While such modern features are highly desired by consumers because of the convenience and energy savings that they provide, the automated dispensing of ice and water outside of the refrigerator/freezer may cause problems upon the failure of one or more of the control components in the appliance. That is, if a failure were to occur such that water is dispensed, flooding of the kitchen or bar area where the refrigerator/freezer is located may occur. Such failures may be the result of a failed electronic sensor or mechanical switch that causes the electronic controller or mechanical control circuitry to believe that the user is requesting that water or ice be dispensed continuously. Other types of failures in the control programming or circuitry of the electronic controller may likewise cause a continuous dispensing of ice or water that may result in water damage if a user is unaware of the uncontrolled dispensing.

For automated operations, manufacturers typically include flow sensors to monitor an amount of fluid dispensed. For example, in filling ice cube trays for an automatic ice maker, the electronic control typically includes a timed or volumetric limitation on the amount of water dispensed into the ice molds. However, since the dispensing of water through the door is normally a user driven function, typical controllers for such appliances do not monitor the flow rate through such dispenser. As such, a failure in the control circuitry that makes the controller believe that the user is requesting that water be dispensed may well result in the continuous, uncontrolled dispensing of water when no user is present, resulting in water damage at least in the proximity of the refrigerator/freezer.

While an additional flow sensor and associated circuitry and control logic could be added to provide protection against such a flooding situation, the increased cost and complexity of such solutions, along with their associated reduction in overall system reliability, makes such solutions unacceptable, particularly in the highly cost competitive consumer appliance market.

In view of the above, there is a need in the art for a new and improved water flow detection and protection system for consumer appliances and the like that utilize multiple flow rates for different functions based on automatic and manual control to prevent or minimize collateral damage resulting from failures in the dispensing control system. Embodiments of the present invention provide such a system and method. These and other advantages of the invention, as well as additional inventive features, will be apparent from the description of the invention provided herein.

BRIEF SUMMARY OF THE INVENTION

In view of the above, embodiments of the present invention provide a new and improved system and method for eliminating or minimizing the amount of damage resulting from a failure in a flow control system. More particularly, embodiments of the present invention provide a new and improved system and method for monitoring multiple flow rates in consumer appliances without requiring additional flow meters be installed in the individual flow lines of the appliance. Still more particularly, embodiments of the present invention provide a new and improved system and method for monitoring multiple flow rates in a consumer appliance to determine the presence of a failure condition and override the normal control of the dispensing operation to minimize damage associated therewith.

In one embodiment of the present invention, a supervisory control circuit or module monitors a single flow sensor to determine an average amount of fluid dispensed through the multiple flow channels over a period of time to determine the likelihood of the existence of a failure condition in the dispensing control system. Preferably the flow meter is positioned in a main water line entering the appliance prior to the division of the water flow to the multiple dispensing circuits contained therein. As the flow meter detects a flow of water, the supervisory circuit or module integrates the flow based on the flow rate to determine an average amount of water dispensed during a predetermined period. In one embodiment this predetermined amount is set so as to not inadvertently signal a failure condition during normal operation of the appliance during both automated and consumer initiated dispensing operations.

In an embodiment of the present invention wherein the supervisory function is coded in software, the system provides a simple software algorithm to be able to always know the average flow in the past, e.g., fifteen minutes when using two different flow rates that minimizing random access memory (RAM) and read only memory (ROM) utilization. This is particularly beneficial in embodiments wherein the controller processor has limited RAM and ROM on board. This embodiment requires knowing the rate when flowing and averages out that rate when not flowing to get a very close understanding of the previous period, e.g., the previous 15 minutes.

In one embodiment of the present invention, the system reduces the calculated value at a rate equal to the preceding rate of flow dispensing once the flow of fluid has ceased. In one embodiment, an accumulation at a first rate will result in a reduction at that first rate upon stoppage of the flow of water at the first rate. The detection of a flow at a second rate will result in an accumulation at a second rate. Upon the halting of the flow, a reduction at that second rate will then begin to reduce the accumulated value.

In one embodiment of the present invention a consumer appliance is provided having a water inlet line in which a flow meter is positioned. A water flow solenoid valve controls the flow of water through the water input line. Downstream of the water flow solenoid valve the inlet line is split into multiple flow paths, e.g. leading to the ice maker and the dispenser. The flow line to the ice maker includes a flow restrictor so as to reduce the flow rate to the ice mold to provide filling thereof. A control valve in each of the dispenser flow lines, i.e. to the ice maker and to the dispenser, are also provided. In one embodiment, a selector switch is utilized by the electronic controller to enable one of the two control valves to provide the proper dispensing at the proper time. Preferably a separate control circuit or module monitors the single flow meter.

This circuitor module accumulates values based on the rate at which the flow meter monitors flow, corresponding to different flow rates to the ice maker and dispenser. Once the flow has stopped, the circuitry or module decrements the accumulated value by the immediately preceding increment rate. If, at any point, this value is incremented above a predetermined threshold, the circuitry or module determines that a failure has likely occurred, and will disable any further flow of fluid therethrough.

In one embodiment this disabling is accomplished by commanding the water flow solenoid valve off, which will inhibit flow to any of the individual flow lines within the appliance. In a further embodiment, the circuitry or module also commands the individual control valves to their off position. This provides a redundant flow stoppage in case one of the two serially connected valves is the source of the failure.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
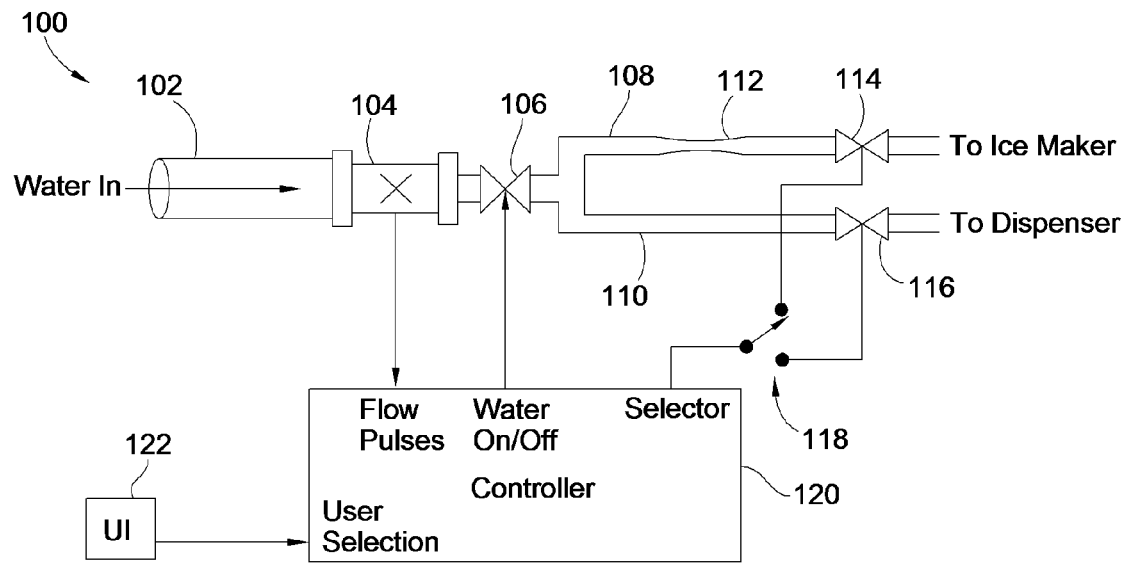
FIG. 1 is a simplified schematic diagram of one embodiment of an appliance water distribution system for an ice maker and a dispenser constructed in accordance with the teachings of the present invention.

Turning now to the drawings, there is illustrated in simplified schematic form in FIG. 1 an embodiment of a water distribution system 100 for a consumer appliance, such as a refrigerator/freezer that includes an ice and water through the door feature. It should be noted, however, that while the illustrations and following description will describe various embodiments of the system and method of the present invention and an operative environment in which such embodiments find particular applicability, these embodiments and description are provided by way of example and not by way of limitation. In other words, other embodiments of the system and method of the present invention may find applicability in other operative environments, the scope and exclusive rights in which are expressly reserved herein.

As may be seen in FIG. 1, the system 100 includes a water inlet line 102 which is typically adapted to receive a flow of water from the home's plumbing system. A single flow meter 104 is positioned in the water inlet line 102 to measure a flow of fluid therethrough during any dispensing condition. The system 100 also includes a water flow solenoid valve 106 that is used to control the primary flow of water into the internal plumbing, e.g. internal plumbing branch lines 108, 110, for distribution and use throughout the appliance.

To provide the controlled flow to the ice maker, the internal plumbing branch line 108 also includes a flow restrictor 112. As such, when the ice maker control valve 114 is opened, the amount of flow to the ice maker is governed by the flow restrictor 112 to provide a controlled fill of the ice molds contained therein. However, there typically is not a flow restrictor included in the internal plumbing branch line 110 leading to the water dispenser. Instead, once the dispenser control valve 116 is commanded on, water is allowed to flow through the internal plumbing branch line 110 through the dispenser and into the user's glass at system pressures. However, other embodiments of the system may provide an additional flow restrictor in the internal plumbing branch line 110, although typically the rate of flow to the ice maker and to the dispenser are different based on the user's desire to rapidly fill a drinking glass and system's requirement for a slow, steady fill of the ice molds located in the ice maker.

In the embodiment illustrated in FIG. 1, a selector switch 118 is utilized by the controller 120 to enable flow either to the ice maker or to the dispenser, but not both. Other embodiments of the present invention do not require the use of the selector switch 118. Such alternate embodiments may allow flow to both the ice maker and to the dispenser at the same time, or may take care of the selective energization of the ice maker control valve 114 and the dispenser control valve 116 within internal circuitry or program control logic of the controller 120. As illustrated in FIG. 1, the controller 120 also receives input from a user interface 122 to coordinate proper control of the user selected operation, i.e. dispensing of crushed ice, cubed ice, or water, along with its automatic ice making operations.

While the physical layout of system 100 may vary extensively between manufacturers, the physical location of the flow meter 104 and the water flow solenoid valve 106 are typically in close physical proximity to the external coupling for the water inlet line 102. In this way, the flow meter 104 may detect any flow of water into the appliance, including flows resulting from failures in the plumbing system internal to the appliance. As a protection against any such failures, the water flow solenoid valve 106 can be closed by the controller 120 when it determines that a flow is occurring not in response to a commanded operation by the controller 120, i.e. water flowing because of a failure condition. Alternatively, the water flow solenoid valve 106 may be in a normally closed position until commanded open by the controller 120 to charge the internal plumbing with water pressure as part of the controlled operation of the dispensing operation. Preferably, the water flow solenoid valve 106 reverts to a closed condition upon failure of the controller 120, or, as will be described more fully below, as a result of a detected failure either within controller 120, in the user interface 122, or either of the ice maker control valve 114 or the dispenser control valve 116.

As discussed above, a failure in the user interface 122 that makes the controller 120 believe that the user has continuously selected the dispensing of water through the dispenser, for example as a result of a failed switch, noise, failed input circuitry, etc., may result in water damage if allowed to continue indefinitely. Other failures that may result in the uncontrolled dispensing of water may include failures within the controller 120 due to a lighting strike or programming malfunction, failed dispenser control valve 116, failed ice maker control valve 114, failed selector switch 118, etc. Recognizing that the controller's control circuitry or programming may cause or contribute to such a failure, a preferred embodiment of the present invention utilizes a separate supervisory control circuit or programming module within controller 120 that may override the control commands from the normal control programming or circuitry.

Figure 2:
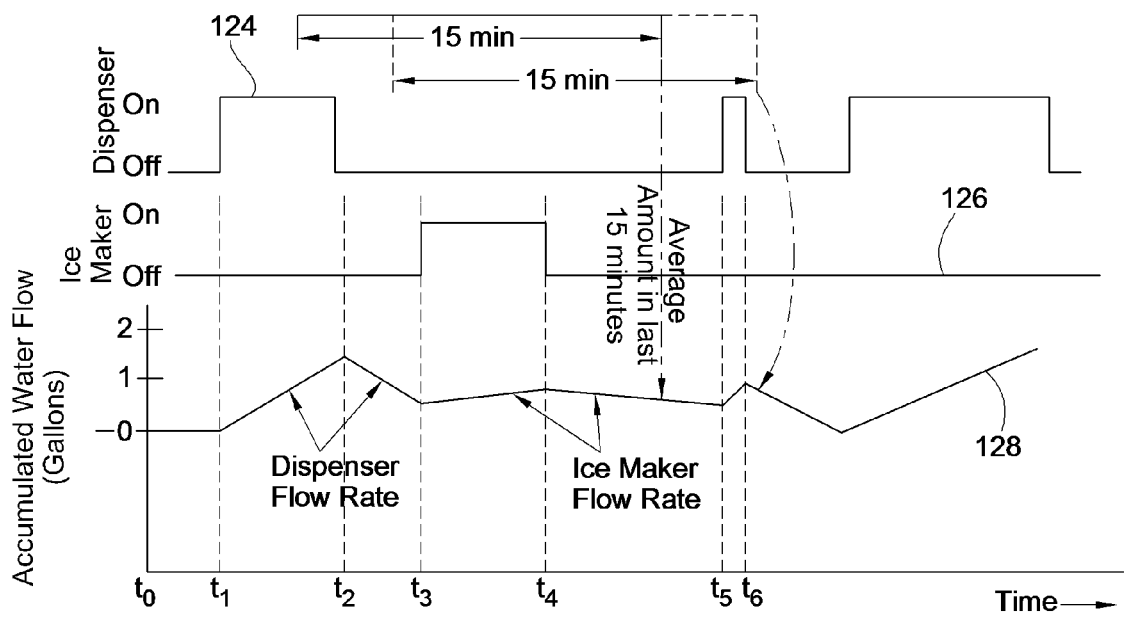
FIG. 2 is a timing control diagram illustrating features of an embodiment of the present invention.

Turning now to FIG. 2, operation of an embodiment of the system of the present invention will described with reference to the graphical illustration contained therein. In this graphical illustration trace 124 illustrates the operational status of the dispenser control valve 116, and trace 124 illustrates the operational status of the ice maker control valve 114. Trace 128 illustrates the accumulated water flow control value used by an embodiment of the system of the present invention to determine whether a supervisory override of the normal control needs to occur.

During operation, the system of the present invention calculates the accumulated water flow control value as will be described more fully below and will institute a safety shutdown of the water dispensing system if this accumulated water flow control value exceeds a predetermined threshold. In one embodiment, the predetermined threshold is set at two gallons. While this value may be varied depending on the normal operational parameters of the refrigerator/freezer, the selection of the value should insure that any water damage caused be the erroneous flow of water should be minimized, without instituting such a shutdown for normal, albeit excessive, utilization by the system or user. In one embodiment of the present invention, the system utilizes the accumulated water flow control value of two gallons in the previous 15 minute period. It should be noted, however, that longer or shorter periods may be utilized in other embodiments, the longer the period the more water may leak from the appliance upon a failure condition.

As illustrated in FIG. 2, the accumulated water flow control value is determined by performing an integration of the water flow at the water flow rate when one of the two control valves 114, 116 is turned on. The accumulated water flow control value is also decremented at the same rate once the control valve 114, 116 is turned off. That is, the system measures the rate of water flow, e.g., when one of the two control valves 114, 116 is turned on, by monitoring the flow meter 104, determines the water flow rate, then uses this water flow rate to adjust the accumulated water flow control value. While one of the two control valves 114, 116 is on, the accumulated water flow control value is incremented at the water flow rate. Once the control valve 114, 116 is turned off, the accumulated water flow control value is decremented at the incrementing rate used when the flow was detected. Utilization of the immediately preceding water increment flow rate is important in installations having multiple flow rates of dispensing such as described above.

With specific reference to FIG. 2, the accumulated water flow control value is at zero until the dispenser control valve 116 is turned on at time $T_1$. Once the dispenser control valve 116 has been turned on, the controller will monitor the flow meter 104 to determine the water flow rate during the dispensing operation. The accumulated water flow control value will then be increased as this rate during the period from $T_1$ to $T_2$ while the dispenser control valve 116 turned on. Once the dispenser control valve 116 is turned off at time $T_2$, the accumulated water flow control value is then decremented at the same rate that it was incremented during the dispensing operation as may be seen by trace 128. This decrementing ends, however, when the accumulated water flow control value reaches zero, or when any dispensing of water is again detected by the flow meter 104.

As illustrated in FIG. 2, such a controlled dispensing event begins at time $T_3$ when the ice maker control valve 114 is turned on. As with the previous dispensing event, the controller 120 will monitor the flow meter 104 and determine the flow rate to be used to increment the accumulated water flow control value. This incrementing at the ice maker flow rate will continue until the ice maker control valve 114 is turned off at time $T_4$. At such a point, the accumulated water flow control value will then be decremented at the immediately preceding increment rate, i.e., the ice maker flow rate. If a subsequent dispensing operation occurs, for example between $T_5$ and $T_6$, even if such dispensing is of very short duration, the accumulated water flow control value will be incremented at the detected rate, and will thereafter be decremented at that same rate.

While the graphical illustration of FIG. 2 demonstrates operation during commanded energization of the different control valves 114, 116, the system will also operate in similar fashion if the detected flow of water is a result of an internal plumbing failure within the appliance or as a result of a failed control valve that does not turn off when commanded to do so. During either such operation, the controller 120 will again sense the flow of water via the flow meter 104 and will determine the rate at which the water is flowing. This rate will then be used to increment the accumulated water flow control value. If the accumulated water flow control value excesses the predetermine threshold, the system will then operate to turn off the water flow solenoid valve 106 in an effort to mitigate any damage that might be caused be a failure within the system.

Indeed, since a preferred embodiment of the present invention utilizes a separate supervisory circuit or software module to perform this safety function, the control inputs to the ice maker control valve 114 and dispenser control valve 116 are not included in the determination or calculation of the accumulated water flow control value. In other words, regardless of the reason that water is flowing within the appliance, an embodiment of the system of the present invention will accumulate at the detected rate the accumulated water flow control value. If the accumulated water flow control value exceeds the predetermined threshold, the system operates to disable or turn off the water flow solenoid valve 106 the control valves 114, 116, or all valves. If the system has not disabled the water flow solenoid valve 106 because the accumulated water flow control value did not exceed the predetermined threshold, the system will then begin to decrement this accumulated water flow control value once the flow of water has stopped at the rate at which it had been accumulated previously.

Once a system shutdown has occurred due to the accumulated water flow control value exceeding the predetermined threshold, the system may operate to disable the water flow solenoid valve 106 for a predetermined period of time, or may require service technician attention before the water flow solenoid valve 106 is allowed to be opened.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of reducing water damage resulting from uncontrolled dispensing of water in an appliance having a single flow meter but multiple flow rates, comprising the steps of:
   incrementing an accumulated water flow control value at a detected water flow rate when water is flowing;
   decrementing the accumulated water flow control value at the detected water flow rate when water is not flowing; and
   disabling the dispensing of water when the accumulated water flow control value exceeds a predetermined threshold.

2. The method of claim 1, wherein the step of decrementing the accumulated water flow control value stops when the accumulated water flow control value reaches zero.

3. The method of claim 1, further comprising the steps of:
   detecting a first flow of water;
   determining a first rate at which the first flow of water is flowing; and
   setting the detected water flow rate to the first rate.

4. The method of claim 3, further comprising the steps of:
   detecting a second flow of water;
   determining a second rate at which the second flow of water is flowing; and
   setting the detected water flow rate to the second rate.

5. The method of claim 1, wherein the step of disabling the dispensing of water comprises the step of commanding a water flow solenoid valve closed.

6. The method of claim 5, wherein the step of disabling the dispensing of water further comprises the step of commanding a control valve associated with the detected water flow closed.

7. The method of claim 1, wherein the step of disabling the dispensing of water comprises the step of commanding all water flow control valves closed.

8. The method of claim 1, wherein the step of disabling the dispensing of water comprises the step of commanding a control valve associated with the detected water flow closed.

9. The method of claim 1, wherein the step of disabling the dispensing of water comprises the step of disabling the dispensing of water for a predetermined period of time.

10. The method of claim 1, wherein the step of disabling the dispensing of water comprises the step of disabling the dispensing of water until reset by maintenance personnel.

11. A method of determining uncontrolled dispensing of water in an appliance having multiple flow rates, comprising the steps of:
    detecting a first flow of water at a first flow rate;
    when the step of detecting a first flow is true, incrementing an accumulated water flow control value at the first rate; and
    thereafter when the step of detecting the first flow is no longer true, decrementing the accumulated water flow control value at the first rate; and
    disabling the dispensing of water when the accumulated water flow control value exceeds a predetermined threshold.

12. The method of claim 11, further comprising the steps of:
    detecting a second flow of water at a second rate;
    when the step of detecting the second flow is true, incrementing the accumulated water flow control value at the second rate; and
    thereafter when the step of detecting a second flow is no longer true, decrementing the accumulated water flow control value at the second rate.

13. The method of claim 11, wherein the step of decrementing the accumulated water flow control value stops when the accumulated water flow control value reaches zero.

14. The method of claim 11, wherein the step of disabling the dispensing of water comprises the step of disabling operation of a water flow solenoid valve.

15. The method of claim 14, wherein the step of disabling the dispensing of water further comprises the step of disabling operation of a control valve associated with the detected water flow.

16. The method of claim 11, wherein the step of disabling the dispensing of water comprises the step of disabling all water flow control valves.

17. The method of claim 11, wherein the step of disabling the dispensing of water comprises the step of de-energizing a control valve associated with the detected water flow.

18. The method of claim 11, wherein the step of disabling the dispensing of water comprises the step of disabling the dispensing of water for a predetermined period of time.

19. The method of claim 11, wherein the step of disabling the dispensing of water comprises the step of disabling the dispensing of water until reset by maintenance personnel.

20. A method of reducing water damage resulting from uncontrolled dispensing of water in an appliance having a single flow meter but multiple flow rates, comprising the steps of:

integrating for a predetermined period of time a detected flow of water signal from the single flow meter to determine an accumulated water flow control value;

decrementing the accumulated water flow control value at a rate of the detected flow of water when water is not flowing; and disabling the dispensing of water when the accumulated water flow control value exceeds a predetermined threshold.

* * * * *